(12) United States Patent
Osogami et al.

(10) Patent No.: US 7,562,004 B2
(45) Date of Patent: Jul. 14, 2009

(54) DETERMINING BETTER CONFIGURATION FOR COMPUTERIZED SYSTEM

(75) Inventors: Takayuki Osogami, Kanagawa-ken (JP); Toshinari Itoko, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 11/443,571

(22) Filed: May 31, 2006

(65) Prior Publication Data

US 2007/0282578 A1    Dec. 6, 2007

(51) Int. Cl.
*G06N 7/06* (2006.01)
(52) U.S. Cl. .................. 703/22; 709/220; 709/228; 703/13; 703/14; 703/21; 713/1
(58) Field of Classification Search ........................ None
See application file for complete search history.

(56) References Cited

U.S. PATENT DOCUMENTS

| | | | |
|---|---|---|---|
| 2002/0007474 | A1 | 1/2002 | Fujita et al. |
| 2005/0203879 | A1 * | 9/2005 | Doris ............................ 707/3 |

FOREIGN PATENT DOCUMENTS

| EP | 1 122 890 | 8/2001 |
|---|---|---|
| JP | 2000-278144 | 10/2000 |
| JP | 2001-267938 | 9/2001 |
| JP | 2002-9633 | 1/2002 |

OTHER PUBLICATIONS

Nelson, Comparisons with a Standard in Simulation Experiments, Management Science vol. 47 No. 3 Mar. 2001, pp. 449-463.*
Fu, Optimization for Simulation, Theory vs. Practice, Informs Journal on Computing vol. 14, No. 3, Summer 2002, pp. 192-215.*
Alrefaei, et. al. Selecting the best stochastic system for large scale problems in DEDS, Mathematics and Computers in Simulation, vol. 64 p. 237-245, 2004.*
Notification of Reason(s) for Refusal dated Sep. 5, 2006.
E.H.L. Aarts et al. (eds.), "Local Search in Combinatorial Optimization," John Wiley & Sons, 1997.

(Continued)

Primary Examiner—Hung Q Pham
Assistant Examiner—Albert Phillips
(74) Attorney, Agent, or Firm—Vazken Alexanian (57) ABSTRACT

A better configuration for a computerized system is determined by performing a first stage and a second stage. In the first stage, the performance of each system configuration, including candidate configurations and a standard configuration, is evaluated, and the number of scenarios needed in the second stage is determined. In the second stage, the performance of each scenario of the standard configuration is evaluated, and the mean thereof is determined. For each candidate configuration, the performance of each scenario of the candidate configuration is evaluated, and the mean thereof is determined. Where the candidate configuration's mean is greater than the standard configuration's mean by a threshold, it is selected as the better configuration. Where no candidate configuration's mean is greater than the standard configuration's mean by the threshold, the standard configuration is selected as the better configuration.

12 Claims, 6 Drawing Sheets

OTHER PUBLICATIONS

R.E. Bechhover et al., "Design and analysis of experiments for statistical selection, screening, and multiple comparisons," John Wiley & Sons, 1995.

G. Grimmett et al., "Probability and random processes," Oxford University Press, 2001 (3d ed.).

S. Kim et al., "A Fully sequential procedure for indifference-zone selection in simulation," ACM Transactions on Modeling & Computer Simulation, 11(3):251-273, 2001.

S. Kotz et al. (eds.), "Encyclopedia of Statistical Sciences," John Wiley & Sons, 2d ed., 2005.

A.M. Law et al., "Simulation modeling and analysis," McGraw-Hill, 3d ed., 2000.

B.L. Nelson et al., "Comparisons with a standard in simulation experiments," Management Science, 47(3):449-463, 2001.

B.L. Nelson et al., "Simple procedures for selecting the best simulated system when the number of alternatives is large," Operations Reserach, 49(6):950-963, 2001.

J. Pichitlamken et al., "A combined procedure for optimization via simulation," Procs. of 2002 Winter Simulation Conference, pp. 292 et seq., 2002.

J.R. Swisher et al., "Discrete-event simulation optimization using ranking, selection, and multiple comparison procedures: Survey," ACM Transactions on Modeling & Computer Simulation, 13(2):134-154 (2003).

B. Xi et al., "A smart hill-climbing algorithm for application server configuration," in Procs. of the 13th Int'l Conf. on World Wide Web, pp. 287-296, 2004.

T. Ye et al., "A recursive random search algorithm for large-scale network parameter configuration," in Procs. of the ACM Sigmetrics, pp. 196-205, 2003.

J. Pichitlamken, "A combined procedure for optimization via simulation," ACM Transactions on Modeling & Computer Simulation, 13(2):155-179, 2003.

S-H. Kim, "Comparison with a standard via fully sequential procedures," ACM Transactions on Modeling & Computer Simulation, 15(2): 155-174, 2005.

B.L. Nelson et al., "Simple procedures for selecting the best simulated system when the number of alternatives is large," Operations Research, vol. 49, No. 6, Nov.-Dec. 2001, pp. 950-963.

* cited by examiner

FIG 3

SECOND STAGE

FIG 4

402 — FOR EACH CONFIGURATION, INCLUDING THE STANDARD CONFIGURATION AND THE CANDIDATE CONFIGURATIONS, DETERMINE SECOND NUMBER OF SCENARIOS OF THE CONFIGURATION, BASED ON THE VARIANCE OF THE CONFIGURATION

404 — EVALUATE PERFORMANCE OF EACH OF A THIRD NUMBER OF SCENARIOS OF THE STANDARD CONFIGURATION, THE THIRD NUMBER OF SCENARIOS BASED ON THE SECOND AND THE FIRST NUMBERS OF SCENARIOS

406 — DETERMINE MEAN OF THE PERFORMANCES OF THE SECOND NUMBER OF SCENARIOS OF THE STANDARD CONFIGURATION

408 — START WITH A CANDIDATE CONFIGURATION

410 — EVALUATE PERFORMANCE OF EACH OF A THIRD NUMBER OF SCENARIOS OF THE CANDIDATE CONFIGURATION, THE THIRD NUMBER OF SCENARIOS BASED ON THE SECOND AND THE FIRST NUMBERS OF SCENARIOS

412 — DETERMINE MEAN OF THE PERFORMANCES OF THE SECOND NUMBER OF SCENARIOS OF THE CANDIDATE CONFIGURATION

414 — MEAN OF THE CANDIDATE CONFIGURATION GREATER THAN MEAN OF STANDARD CONFIGURATION BY MORE THAN A THRESHOLD?

YES → 416 CANDIDATE CONFIGURATION IS BETTER THAN STANDARD CONFIGURATION

NO ↓

418 — MORE CANDIDATE CONFIGURATIONS?

YES → 420 PROCEED TO NEXT CANDIDATE CONFIGURATION

NO ↓

422 — NO CANDIDATE CONFIGURATION IS BETTER THAN STANDARD CONFIGURATION

204

DETERMINING BETTER CONFIGURATION FOR COMPUTERIZED SYSTEM

FIELD OF THE INVENTION

The present invention relates generally to computerized systems that are capable of being configured in accordance with a number of different configurations, and more particularly to determining the substantially optimal configurations for such computerized systems.

BACKGROUND OF THE INVENTION

Achieving optimal performance, such as short response time, high throughput, user fairness, and so on, is often a central goal in designing computerized systems, including communication systems, Internet web servers, supercomputers, and computer networks. Although it can be easy to come up with many possible configurations for a computerized system, it is usually a difficult and time-consuming task to select the best possible, or most optimal, configuration among many such possibilities so that system performance is optimized.

For example, designing a high-performance Internet web server system involves determining the best possible combination of hardware components, scheduling or dispatching policies, and configuration parameter values, such as cache sizes and timeout values, for each server and database. Since there is a large number of possible configurations, and since estimating the performance of each configuration via simulation or experiment often requires tens of minutes, it is impractical to accurately evaluate the performance of all possible configurations to identify the most optimal configuration.

One prior art approach for finding the optimal solution, or configuration, from a large set of possible solutions is known as local search. Local search iteratively finds a better solution from the "neighbors" of a current solution, and replaces the current solution with a neighboring, better solution. A local search algorithm may be augmented with existing mechanisms to escape from a locally optimal but globally suboptimal solution.

Although local search was originally developed for non-stochastic optimization problems, it has recently started to receive attention as a promising approach for optimizing stochastic systems whose performance can be estimated via simulations or experiments, where the terminology simulation is used synonymously with the terminology experiment herein. For example, one prior art local search approach applies a recursive random search algorithm to the performance optimization of network protocols, where the performance is estimated via simulations. Another prior art approach applies a hill-climbing algorithm to optimize the configuration parameters of Internet web servers, where the performance is measured via experiments.

Although local search limits the search space to a smaller number of system configurations, simulations or experiments often require many iterations, such as many samples of simulated performance, simply to estimate the performance of a single configuration. For example, a test run may require fifteen minutes to estimate the mean response time for each configuration of an Internet web server. As a result, just a small number out of many possible configuration parameters may be effectively optimized via local search. Therefore, to optimize the performance of stochastic systems via local search, it is important to minimize the time needed for simulations to find a better system configuration from neighboring system configurations.

For these and other reasons, there is a need for the present invention.

SUMMARY OF THE INVENTION

The present invention relates to determining a better configuration for a computerized system. A method of an embodiment of the invention includes a first stage and a second stage. For each configuration of a number of configurations for a computerized system, including a standard (i.e., current to some degree) configuration and a number of candidate (i.e., neighboring to some degree) configurations, the following is performed in the first stage. First, the performance of each of a first number of scenarios in which the configuration is able to be simulated is evaluated. This is also known as "taking a sample" or "sampling" a scenario of the configuration. As used herein, simulation is synonymous with experimentation as a way to evaluate performance of a scenario of a configuration. Second, the variance of the performances of the first number of scenarios of the configuration is determined.

In the second stage, for each configuration, a second number of scenarios is determined in which the configuration is able to be simulated, and for which performance of the configuration is able to be evaluated, based on the variance that has been determined. The performance of each of a third number of scenarios in which the standard configuration is able to be simulated is evaluated, where this third number of scenarios is based on the second and the first numbers of scenarios. The mean of the performances of the second number of scenarios of the standard configuration is determined.

Next, still in the second stage, for each candidate configuration, in a given order of the candidate configurations, the performance of each of a third number of scenarios in which the candidate configuration is able to be simulated is evaluated. As before, the third number of scenarios is based on the second and the first numbers of scenarios. The mean of the performances of the second number of scenarios is determined. Where the mean of the performances of the second number of scenarios of the candidate configuration is greater than the mean of the performances of the second number of scenarios of the standard configuration by more than a threshold, then the candidate configuration in question is selected as the better configuration for the computerized system, and the second stage is exited. If the mean of the performances of the second number of scenarios of any candidate configuration is not greater than the mean of the performances of the second number of scenarios of the standard configuration by more than a threshold, then the standard configuration is selected as the better configuration for the computerized system.

A computerized system of one embodiment of the invention includes a simulation component and a selection component. The simulation component is to test a target system, such as by either simulation or experimentation. The selection component is to direct the simulation component to test the target system, and to select a substantially optimal configuration for the target system. The selection component in particular performs the method that has been described to achieve this selection, in relation to the target system.

An article of manufacture of one embodiment of the invention includes a tangible computer-readable medium and means in the medium. The tangible medium may be a recordable data storage medium, or another type of tangible computer-readable medium. The means may be one or more computer programs stored on the medium. The means is for performing the method that has been described.

Embodiments of the invention provide for advantages over the prior art. In particular, the method that has been described increases performance of local search for optimizing system configuration. In one embodiment, only the necessary configurations are evaluated, and these configurations are evaluated only with the necessary accuracy. That is, not all the configurations need to be evaluated, and any given configuration just has to be evaluated to a desired accuracy, and not to complete precision. Thus, the performance of each configuration need not be estimated accurately, but only whether one configuration is better than another.

The two-stage approach of embodiments of the invention has strong statistical properties. First, if a better system configuration is determined, then this system configuration is in fact better than the standard system configuration with an arbitrarily high probability. Second, if a better system configuration is not determined, then the standard system configuration is in fact better than any of the candidate system configurations with an arbitrarily high probability. These statistical properties are guaranteed based on the properties of a normal distribution of the configurations.

In the first stage, the performance of each system configuration under consideration is evaluated under a predetermined number of scenarios, and the number of scenarios needed in the second stage is determined based on the sample variance of the performance in the first stage. In the second stage, the performance of each system configuration is evaluated, but the method is terminated as soon as a better system configuration is located.

As used herein, a configuration is also referred to as a solution, and the performance of a given configuration is referred to as the quality of a solution, such that evaluating the performance of a configuration is synonymous with taking a sample of a configuration against a particular scenario or situation. That is, a scenario may be the data against which the performance of a configuration is evaluated, where a configuration is the set of different hardware, software, and/or parameter values of the computerized system. Still other aspects, embodiments, and advantages of the present invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
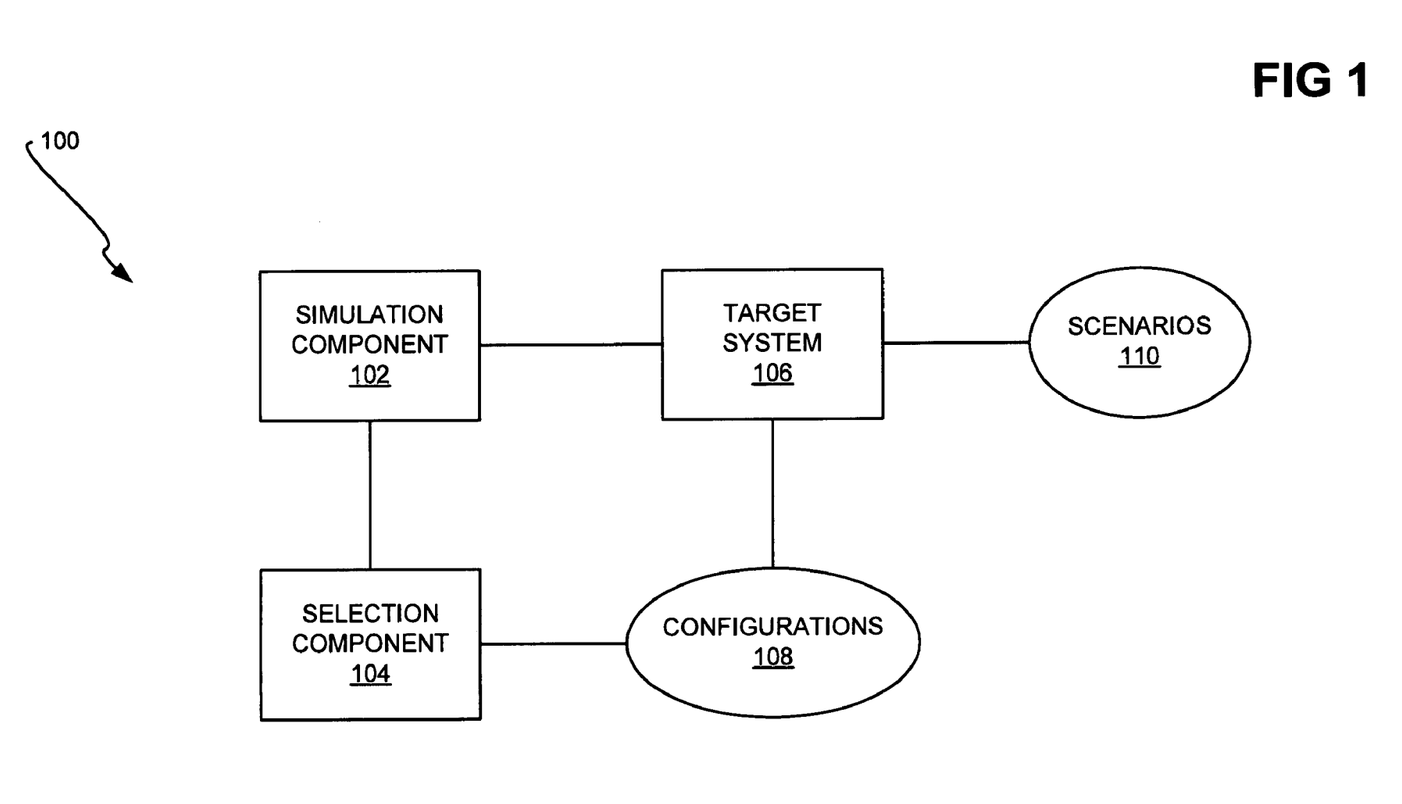
FIG. 1 is a diagram of a system for evaluating a target system having a number of different configurations that can be simulated under a number of different scenarios, according to an embodiment of the invention.

FIG. 1 shows a computerized system 100, according to an embodiment of the invention. The system 100 includes a simulation component 102 and a selection component 104. The system 100 may include other components, in addition to and/or in lieu of those depicted in FIG. 1. Each of the components 102 and 104 may be implemented in software, hardware, or a combination of hardware and software.

The simulation component 102 is able to test a target system 106. The target system 106 has a number of different configurations 108. Each configuration may represent a different combination of hardware, software, and/or parameters and other aspects of the system 106. The component 102 tests a configuration of the target system 106 against a number of different scenarios 110. The scenarios 110 each represent different data, such as different number of users using the target system 106, different ways in which the target system 106 is used, and so on. The component 102 tests a configuration in that it simulates the configuration to yield a performance of the configuration, where the terminology simulation is used synonymously with the terminology experimentation here.

The scenarios 110 are more formally referred to as sample paths, and the configurations 108 are more formally referred to as solutions. Taking a sample of a configuration of the target system 106 means evaluating the performance, via the simulation component 102, of the configuration against a particular one of the scenarios 110. Mathematically there are solutions or configurations $\pi_i$, for $i=1, \ldots, k$. Simulating the configuration $\pi_i$ against a number of the scenarios 110 yields a performance of the configuration that can be mathematically described as having a mean $\mu_i$ and a standard deviation $\sigma_i$. Stated another way, simulating the solution $\pi_i$ yields a sample of a normal random variable with $\mu_i$ and $\sigma_i$.

The selection component 104 directs the simulation component 102 to test the target system 106, and based on that testing, selects a substantially optimal configuration for the target system 106, and configures the target system 106 in accordance with this substantially optimal configuration. The particular manner by which testing and selection of a substantially optimal configuration for the target system 106 is performed is described in relation to the methods, later in the detailed description. The configurations 108 of the target system 106 include a standard configuration, which may be considered as the current configuration of the target system 106, as well as a number of candidate configurations, which are alternate configurations of the target system 106 to be considered and evaluated.

The purpose of selecting a substantially optimal configuration can be described more mathematically as determining the locally best solution, or configuration, $\pi_b$, which has a mean $\mu_b$, larger than the mean of any of the configuration's neighboring configurations, with high probability, $\geq 1-\alpha$ for a given $\alpha$ (selected as desired to select a desired probability), so that the total number of samples taken is minimized. An error is allowed within an indifference zone $\delta$, so that any solution having a mean $\geq \mu_b - \delta$ is considered to be one of the best solutions. This is why, therefore, the substantially optimal configuration is determined, as compared to, for instance, the most optimal configuration.

Figure 2:
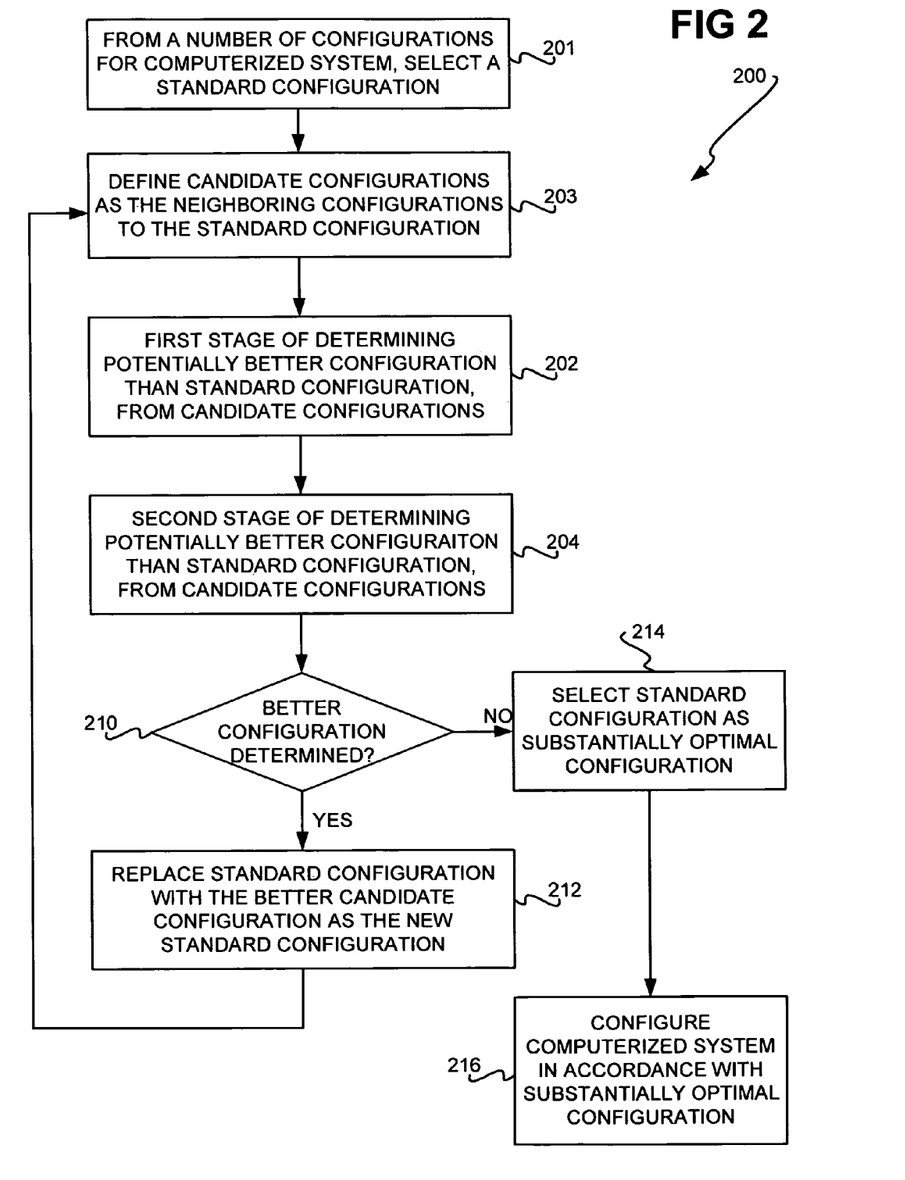
FIG. 2 is a flowchart of a two-stage method for determining a substantially optimal configuration of a computerized system, such as the target system of FIG. 1, and configuring the system in accordance with this substantially optimal configuration, according to an embodiment of the invention.

FIG. 2 shows a method 200, according to an embodiment of the invention. The method 200 may be performed by the selection component 104, directing the simulation component 102 as needed, to determine the substantially optimal configuration of the target system 106, and to configure the target system 106 in accordance with this substantially optimal configuration. It is noted that the method 200 is described in relation to a computerized system, which thus may be the target system 106 of FIG. 1.

The method 200 begins by selecting a standard configuration from a number of possible configurations for a computerized system (201). The standard configuration may be selected from the possible configuration is any way, such as in accordance with the prior art. For instance, in one embodiment, the standard configuration may simply be selected at random from all the possible configurations for the computerized system.

Next, a set of candidate configurations is defined as the configurations that neighbor the standard configuration within the solution space in question (203). Determining the neighboring configurations to the standard configuration selected is known within the art. For instance, an appropriate neighbor algorithm can be applied to the standard configuration to determine the neighboring configurations, and hence the set of candidate configurations.

Thereafter, the method 200 generally includes a first stage (202), and a second stage (204). In the first stage, the performance of each candidate configuration and the under consideration and the standard configuration is evaluated under a predetermined number of scenarios, and the number of scenarios needed in the second stage is determined based on the sample variance of the performance in the first stage. In the second stage, the performance of each of these system configurations is evaluated, but the method is terminated as soon as a better system configuration is located. That is, the first stage 202 and the second stage 204 of the method 200 determine whether one of the candidate configurations is better than the standard configuration.

Mathematically, in the stages 202 and 204, a candidate configuration or solution $\pi \in C \equiv (\pi_1, \ldots, \pi_k)$ is selected that is better than the standard configuration or solution $\pi_0$, or the standard solution $\pi_0$ is selected if there is no better candidate in the set of candidate solutions C. $A \equiv \{\pi_0\} \cup C$ and denotes all the solutions or configurations, including the standard solution or configuration and all the candidate solutions or configurations. $\mu_i$ and $\sigma_i$ are the mean and standard deviation, respectively, of solution $\pi_i \in A$. Furthermore, $B \equiv \{\pi_i \in C | \mu_i > \mu_0\}$, and denotes the set of more optimal, or better candidate configurations, than the standard configuration. $\pi_b$ denotes any one of the best candidate configurations, so that $\mu_b \geq \mu_i$, $\forall \mu_i \in C$.

The solution $\pi$ selected by the stages 202 and 204 satisfies the following properties:

$$Pr(\pi=\pi_0|\mu_0 \geq \mu_b) \geq 1-\alpha \quad (1)$$

$$Pr(\pi \in B|\mu_b \geq \mu_0+\delta) \geq 1-\alpha \quad (2)$$

$$Pr(\pi \in B \cup \{\pi_0\}|\mu_0+\delta > \mu_b > \mu_0) \geq 1-\alpha \quad (3)$$

It is noted that parts 202 and 204 can be used alone to determine whether any of one or more given candidate configurations are better than a standard configuration, such as a currently used configuration.

If a candidate configuration that is better than the standard configuration is located by performing the stages 202 and 204 (210), then the standard configuration is replaced with this better candidate configuration (212). The better candidate configuration thus becomes the new standard configuration, and the method 200 is repeated beginning at part 203. Ultimately, performance of the stages 202 and 204 will yield that none of the candidate configurations is better than the standard configuration (210), in which case the standard configuration is selected as the substantially optimal configuration for the computerized system (214). Thus, the computerized system is then configured in accordance with this substantially optimal configuration (216).

Figure 3:
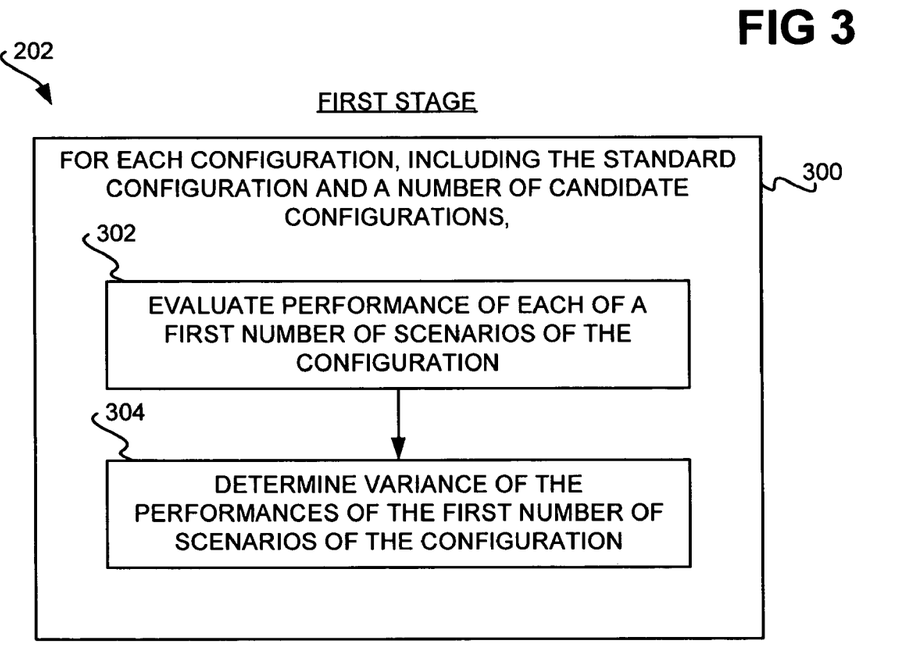
FIG. 3 is a flowchart of a method of the first stage of the method of FIG. 2 in detail, according to an embodiment of the invention.

FIG. 3 shows one manner by which the first stage 202 of the method 200 of FIG. 2 can be implemented, according to an embodiment of the invention. The following is performed for each configuration of the computerized system, including the standard configuration and all the candidate configurations, and thus for each $\pi_i \in A$ (300). First, the performance of each of a first number of scenarios of the configuration is evaluated (302). The first number of scenarios may be at least a subset of the scenarios 110 of FIG. 1, for instance. The first number of scenarios is denoted as $n_0$. Evaluating the performance of a predetermined number of scenarios is also referred to as taking a number of samples of the configuration in question.

Next, the variance of the performances of the first number of scenarios of the configuration is determined (304). That is, the sample variance $S_i^2$ is determined for each configuration or solution. The sample variance may be determined as $$S_i^2 = \frac{1}{n_0-1} \sum_{l=1}^{n_0} \left(X_{i,l} - \overline{X}_i^{(n_0)}\right)^2,$$

where $X_{i,l}$ is the l-th sample (i.e., the l-th scenario of which the performance has been evaluated) from $\pi_i$, and $$\overline{X}_i^{(n_0)} = \frac{1}{n_0} \sum_{l=1}^{n_0} X_{i,l}$$

is the sample mean for $\pi_i \in A$. In theory, $n_0$ can be any integer >1. In practice, $n_0$ should be selected such that the sample variance becomes a reasonable estimate of the true variance, since poor estimation of the true variance (i.e., too small $n_0$) results in a greater number of samples in the second stage. In one embodiment, $n_0=20$.

Figure 4:
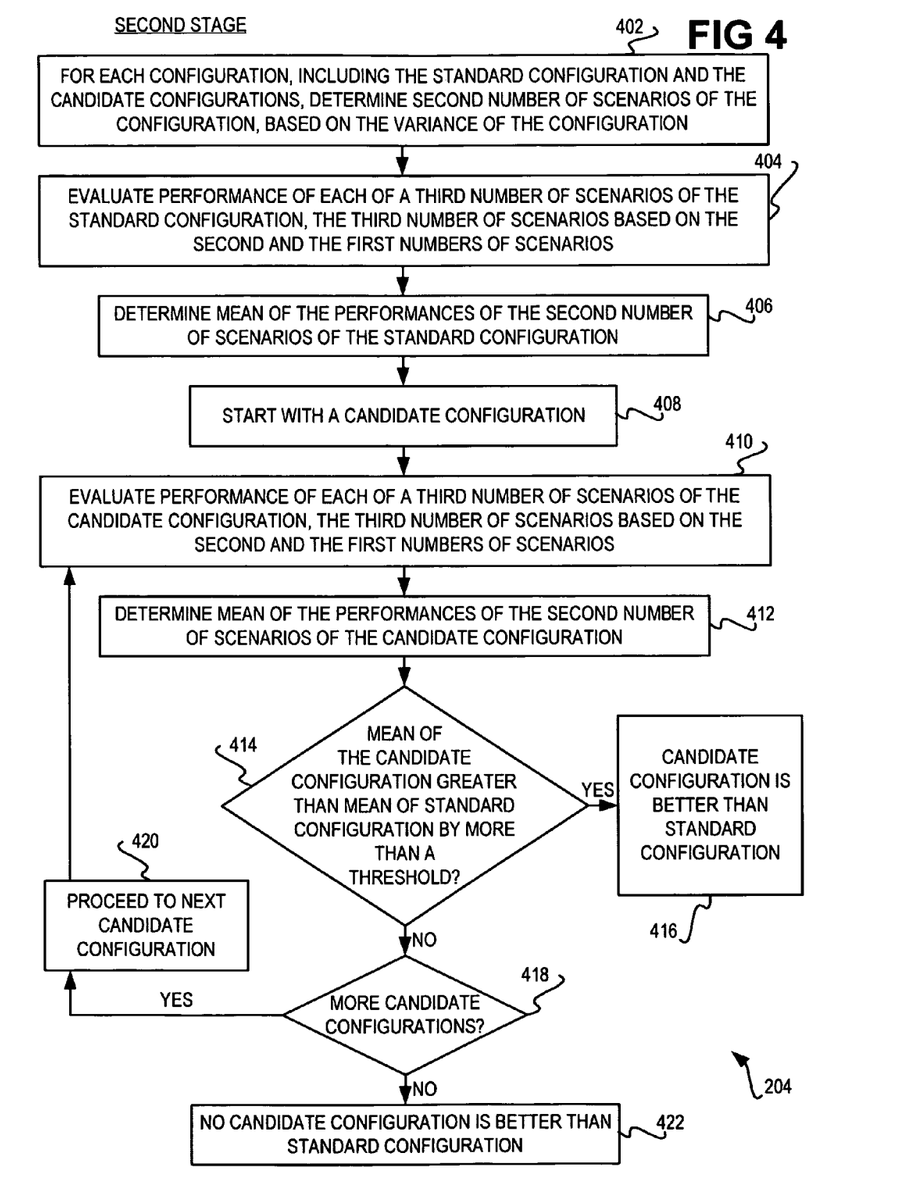
FIG. 4 is a flowchart of a method of the second stage of the method of FIG. 2 in detail, according to an embodiment of the invention.

FIG. 4 shows one manner by which the second stage 204 of the method 200 of FIG. 2 can be implemented, according to an embodiment of the invention. First, for each configuration, including the standard configuration and all the candidate configurations, a second number of scenarios is determined, based on the variance of the configuration in question (402). That is, the second stage first determines the number of samples, $N_i$, that should be taken from $\pi_i$, via $$N_i = \max\left\{n_0, \left\lceil \frac{(g^*)^2 S_i^2}{\delta^2} \right\rceil\right\} \quad (4)$$

for each solution $\pi_i \in A$. The value $g^*$ is a confidence parameter that is described later in the detailed description. $S_i^2$ is the variance that was determined in the first stage. $\delta$ is a threshold constant. The second number is thus referred to as $N_i$.

Next, the performance of each of a third number of scenarios of the standard configuration is evaluated, where this third number of scenarios is based on the second and the first numbers of scenarios of the standard configuration (404). More particularly, $N_0 - n_0$ samples are taken. That is, the third number is $N_0 - n_0$, and thus is based on the first and the second numbers, by subtracting the first number from the second number. The samples are taken by evaluating the performance of each of this third number of scenarios. The scenarios may be selected from the scenarios 110 in one embodiment. The mean of these performances of the second number of scenarios of the standard configuration, as evaluated, is then determined (406). That is, the sample mean $\overline{X}_0^{(N_0)}$ is determined, and is calculated as is described in more detail in particular relation to candidate configurations. In other words, the mean of the $N_0$ performances is determined.

The candidate configurations are then evaluated in a given order of C, such that evaluation starts with a given candidate configuration (408). The candidate configurations may be ordered in any order, but different orders of C for the candidate configurations are described later in the detailed description, such that the expected total number of samples taken by performing the second stage is minimized. Thus, the performance of each of a third number of scenarios of the candidate configuration in question is evaluated, where this third number of scenarios is based on the second and the first numbers of scenarios of this candidate configuration (410). More particularly, therefore, $N_i - n_0$ samples are taken for candidate configuration $\pi_i$. The third number, as before, is $N_i - n_i$, and thus is based on the first and the second numbers, by subtracting the first number from the second number.

The mean of these performances of the second number of scenarios of the candidate configuration in question, as evaluated, is then determined (410). In other words, the mean of the $N_i$ performances is determined. That is, the sample mean is determined as $$\overline{X}_i^{(N_i)} = \frac{1}{N_i} \sum_{l=1}^{N_i} X_{i,l}.$$

Now, the second stage determines whether the candidate configuration that has been just evaluated is better than the standard configuration. This is achieved by determining whether the mean of the candidate configuration is greater than the mean of the standard configuration by more than a threshold c (414). Mathematically, this criterion is $$\overline{X}_i^{(N_i)} \geq \overline{X}_0^{(N_0)} + c. \quad (5)$$

If this criterion is true for the candidate configuration under evaluation (414), then this candidate configuration is selected as the configuration that is better than the standard configuration (416), and the second stage 204 is finished. That is, if (5) holds for $\pi_i \in C$, then the second stage 204 determines that $\pi_i$ is a better configuration than the standard configuration, and terminates.

If there are any further candidate configurations that have not yet been considered (418), then the next candidate configuration within the order C of candidate configurations is selected or proceeded to (420), and parts 410 and 412 are performed for this new candidate configuration. At some point, either a candidate configuration that is better than the standard configuration will be found, such that the second stage 204 terminates at part 216, or there are no further candidate configurations within C, and the method proceeds from part 418 to part 422. In this latter situation, the second stage 202 determines that the standard configuration is better than all the candidate configurations (422), since none of the candidate configurations is better than the standard configuration.

In criterion (5), the threshold c is a constant such that $0<c<\delta$. This is based on the following intuition. First, if $\mu_i = \mu_0$, then it should be determined that $\pi_i$ is no better than $\pi_0$. However, if the criterion were instead $\overline{X}_i^{(N_i)} \geq \overline{X}_0^{(N_0)}$, an infinite number of samples would be needed to make a correct decision with probability $>1/2$, since the sample mean would have to match the true mean exactly. Therefore, $c>0$, and, indeed, a larger c results in a smaller number of samples to make a correct decision when $\mu_i = \mu_0$.

On the other hand, if $\mu_i = \mu_0 + \delta$, then it should be determined that $\pi_i$ is better than $\pi_0$. If the criterion were instead $\overline{X}_i^{(N_i)} \geq \overline{X}_0^{(N_0)} + \delta$, however, an infinite number of samples would again be needed to make a correct decision with probability $>1/2$. Thus, $c<\delta$, and in fact a smaller c results in a small number of samples to make a correct decision when $\mu_i = \mu_0 + \delta$. This suggests that c should be selected such that it is sufficiently larger than 0 and sufficient smaller than $\delta$ to minimize the necessary number of samples.

A criterion ratio $\gamma^*$, which determines c via $c = \gamma^* \delta$, is next described. The criterion ratio is selected so that $N_i$ can be minimized. The confidence parameter $g^*$ determines $N_i$ via $$N_i = \max\left\{n_0, \left\lceil \frac{(g^*)^2 S_i^2}{\delta^2} \right\rceil\right\},$$

as has been-described. Therefore, $\gamma^*$ is selected so that $g^*$ is minimized. A difficulty, however, is that the confidence parameter $g^*$ has to be selected large enough such that (1)-(3) are satisfied.

Formally, the confidence parameter $g^*$ is an extension of the Rinott constant, used in Rinott's algorithm for selecting a best solution, as known to those of ordinary skill within the art, and as described in the reference Y. Rinott, "On two-stage selection procedures and related probability inequalities," Communications in Statistics—Theory and Methods, A7(8): 799-811 (1978). The Rinott constant, $h_{k+1,1-\alpha,n_0-1}$, is the unique constant h such that $f_{k,n0-1}(h) = 1-\alpha$, where $$f_{t,v}(h) \equiv \left( Z_i \leq \frac{h}{\sqrt{v\left(\frac{1}{Q_i} + \frac{1}{Q_0}\right)}}, i = 1, \ldots, t \right) \quad (6)$$

is Rinott's distribution function. $Z_i$ is the standard normal random variable, $Q_i$ is the $\chi^2$ random variable with degree of freedom v for i=0, 1, ..., t, and $Z_i$'s and $Q_i$'s are independent of one another. The Rinott constant can be calculated by an algorithm as described in the reference R. E. Bechhofer et al., "Design and analysis of experiments for statistical selection, screening, and multiple comparisons," John Wiley & Sons (1995). This reference finds h such that $f_{k,n_0-1}(h)=p$ by binary search, where $f_{k,n_0-1}(h)$ is evaluated via numerical integration based on Gauss-Laguerre quadrature, as can be appreciated by those of ordinary skill within the art.

Therefore, the confidence parameter g* is defined as $$g^* \equiv \min_{0<\gamma<1} \max\{g_1(\gamma), g_2(\gamma)\}, \quad (7)$$

where $g_1(\gamma)$ and $g_2(\gamma)$ are the unique $g_1$ and $g_2$, respectively, that satisfy $$f_{k,n_0-1}(\gamma g_1)=1-\alpha \quad (8)$$

$$f_{k-1,n_0-1}(\gamma g_2)+f_{1,n_0-1}((1-\gamma)g_2)-1=1-\alpha \quad (9)$$

for $0<\gamma<1$. The minimizer of (7) is denoted by $\gamma^*$. Roughly speaking, (1) and (3) are satisfied if a confidence parameter, g*, is selected such that $g^*>g_1(\gamma)$ and $v\geq 1$. Furthermore, (2) is satisfied if $g^*>g_2(\gamma)$. It is noted that in particular $$f_{k,n_0-1}(\gamma^* g^*)\geq 1-\alpha \quad (10)$$

$$f_{k-1,n_0-1}(\gamma^* g^*)+f_{1,n_0-1}((1-\gamma^*)g^*)-1\geq 1-\alpha \quad (11)$$

since $f_{t,v}(x)$ is an increasing function of x for any $t\geq 1$ and $v\geq 1$. It is noted that the confidence parameter g* and the criterion ration $\gamma^*$ are constants that depend only on k, $\alpha$, and $n_0$.

In one embodiment, a standard search algorithm can be employed to find g* and $\gamma^*$, where $g_1(\gamma)$ and $g_2(\gamma)$ are calculated for each given $\gamma$ by a binary search algorithm similar to the Rinott constant. In practice, it can take a few seconds to compute a pair $(g^*,\gamma^*)$ for each triple $(k,\alpha,n_0)$. When this computation becomes a bottleneck however, the constants may be computed beforehand and stored in a table.

The second stage 204 of FIG. 4 allows an arbitrary order on C in which samples are taken. However, since the second stage 204 can terminate as soon as a better candidate configuration than the standard configuration is found, the expected total number of samples taken depends on a particular order of the candidate configurations in which the samples are taken. Therefore, an optimal order of C is now described. The optimal order depends on unknown parameters, however, although these parameters can be estimated, as will be described. In general, the order may be arbitrary or random instead of being optimal.

First, let N be the number of samples required after $N_0$ samples of $\pi_0$ have been taken in part 404 of the second stage 204 of FIG. 4, where t is the moment after $N_0$ samples of $\pi_0$ have been taken, and given $X_{0,l}$ for $l=1, \ldots, N_0$ and $X_{1,l}$ for $l=1, \ldots, n_0$ for all $\pi_i \in C$. Furthermore, let $F_t$ be all the information up to the moment t, specifically, the $\sigma$-field generated by $X_{0,l}$ for $l=1, \ldots, N_0$ and $X_{1,l}$ for $l=1, \ldots, n_0$ for all $\pi_i \in C$. Also, let C be ordered such that $\pi_i$ is the i=th candidate configuration that is sampled within the second stage 204. Then, $$E[N] = \sum_{i=1}^{k} (N_i - n_0) \prod_{j=1}^{i-1} Pr\left(\overline{X}_j^{(N_j)} < \overline{X}_0^{(N_0)} + c \mid F_t\right) \quad (12)$$

since $N_i - n_0$ is counted in N if and only if $\overline{X}_j^{(N_j)} < \overline{X}_0^{(N_0)}+c$ for all $j=1, \ldots, i-1$, and $\overline{X}_j^{(N_j)}$'s are independent of each other. Hereafter, only those candidates $\pi_i \in C$ such that $N_i > n_0$ are considered, since a candidate configuration $\pi_i$ with $N_i > n_0$ does not contributed to N and should be considered beforehand.

Now, let $p_i=Pr(\overline{X}_i^{(N_i)} \geq \overline{X}_0^{(N_0)}+C|F_t)$, i.e., the probability that $\pi_i$ is selected as a better candidate configuration if its sample mean is compared to the standard, given $F_t$. Then, E[N] is minimized when candidate configurations, C, are ordered such that $$\frac{N_i - n_0}{p_i} \leq \frac{N_{i+1} - n_0}{p_{i+1}} \quad (13)$$

for all consecutive pairs $(\pi_i, \pi_{i+1})$ in C.

A remaining question is determining $p_i$. A difficulty is that $p_i$ depends on unknown parameters $\mu_i$ and $\sigma_i$. However, these parameters can be estimated based on the samples taken in the first stage 202. Thus, let $Y_i$ be the sample average of $\pi_i$ in the second stage 204; that is, $$Y_i = \frac{1}{N_i - n_0} \sum_{l=n_0+1}^{N_i} X_{i,l}.$$

A simple transformation thus yields $$p_i = Pr\left(\frac{Y_i - \mu_i}{\sqrt{\frac{\sigma_i^2}{N_i - n_0}}} \geq \frac{\frac{N_i(\overline{X}_0^{(N_0)}+c) - n_0 \overline{X}_i^{(n_0)}}{N_i - n_0} - \mu_i}{\sqrt{\frac{\sigma_i^2}{N_i - n_0}}} \mid F_t\right)$$

It is noted that the right-hand side in Pr($\bullet$) is a constant, given $F_t$. A reasonable estimate of $p_i$ is given by replacing $\mu_i$ and $\sigma_i^2$ by $\overline{X}_i^{(n_0)}$ and $S_i^2$, respectively. This is because the left-hand side in Pr($\bullet$) of the above expression is the standard normal random Z, such that $$p_i \approx Pr\left(Z \geq \frac{\frac{N_i}{N_i - n_0}(\overline{X}_0^{(N_0)}+c - \overline{X}_i^{(n_0)})}{\sqrt{\frac{S_i^2}{N_i - n_0}}} \mid F_t\right) \quad (14)$$

$$p_i = Pr\left(Z \leq -\sqrt{\frac{N_i}{N_i - n_0}}(\overline{X}_0^{(N_0)}+c - \overline{X}_i^{(n_0)})\frac{g^*}{\delta} \mid F_t\right)$$

where the last equality follows from (4). Thus, a reasonable estimate of $p_i$ as a value of the standard normal distribution function is obtained in (14).

It is noted that the choice of $N_i$ in the method 200 is conservative, since it guarantees (1)-(3) for any order, and in particular the worst order, of sampling within the second stage 204. For example, consider the case of ten candidate configurations, $C=\{\pi_1, \ldots, \pi_{10}\}$, with $\mu_{10}=10$ and $\mu_0$ for $i=1, \ldots, 9$. It is further assumed that $\mu_0=2$ and $\delta=1$. In this case, $\pi_{10}$ has to be selected as the better candidate configuration, and any other selection is a mistake. The worst order, in which the method 200 is most likely to make a mistake, is the one where $\pi_{10}$ is the last candidate. In this worst order, the method 200 has to determined that $\pi_i$ is no better than $\pi_0$ (i.e., $\overline{X}_i^{(N_i)} < \overline{X}_0^{(N_0)}+c$ needs to hold) for $i=1, \ldots, 9$, and that $\pi_{10}$ is better than $\pi_0$ (i.e., $\overline{X}_{10}^{(N_{10})} \geq \overline{X}_0^{(N_0)}+c$ needs to hold). However, if $\pi_{10}$ were the first candidate, only $\overline{X}_{10}^{(N_{10})} \geq \overline{X}_0^{(N_0)}+c$ would need to hold, and the relationship between $\overline{X}_i^{(N_i)}$ and $\overline{X}_0^{(N_0)}$ would not matter for $i=1, \ldots, 9$. Therefore, by first sampling from candidate solutions that are likely to be better than the standard solution, $N_i$ may be reduced.

Next, the uniformly random order of sampling in the second stage 204 is considered. Although the random order does not necessarily bias towards better candidate configurations, it avoids biasing towards worse solutions with high probability for any given candidate configurations, thus allowing a reduction in $N_i$. The randomized approach discussed here is the same as the method 200 that has been described, except that C is sorted in the uniformly random order at the beginning of the second stage 204, as can be appreciated by those of ordinary skill within the art, the confidence parameter $g^*$ is replaced with $\hat{g}^*$, and the criterion ratio $\gamma^*$ is replaced with $\hat{\gamma}^*$, as defined below. This randomized approach satisfies (1)-(3), where $\pi$ is the solution selected by the randomized approach as the better configuration for the computerized system.

The confidence parameter $\hat{g}^*$ and the criterion ratio $\hat{\gamma}^*$ are determined similarly to $g^*$ and $\gamma^*$. In particular, the confidence parameter $\hat{g}^*$ is defined as $$\hat{g}^* \equiv \min_{0<\gamma<1} \max\{g_1(\gamma), g_2(\gamma)\},$$

where $g_1(\gamma)$ and $g_2(\gamma)$ are the unique $g_1$ and $g_2$, respectively, that satisfy $$f_{k,n_0-1}(\gamma g_1) = 1 - \alpha$$

$$\frac{1}{k}\sum_{i=1}^{k-1} f_{i,n_0-1}(\gamma g_2) + f_{1,n_0-1}((1-\gamma)g_2) - 1 = 1 - \alpha,$$

for $0<\gamma<1$. The minimizer of (7) is denoted by $\hat{\gamma}^*$. Roughly speaking, (1) and (3) are satisfied if a confidence parameter, $\hat{g}^*$, is selected such that $\hat{g}^* > g_1(\gamma)$. Furthermore, (2) is satisfied if $\hat{g}^* > g_2(\gamma)$. It is noted that in particular $$f_{k,n_0-1}(\hat{\gamma}^* \hat{g}^*) \geq 1 - \alpha \tag{15}$$

$$\frac{1}{k}\sum_{i=1}^{k-1} f_{i,n_0-1}(\hat{\gamma}^* \hat{g}^*) + f_{1,n_0-1}((1-\hat{\gamma}^*)\hat{g}^*) - 1 = 1 - \alpha, \tag{16}$$

since $f_{t,v}(x)$ is an increasing function of x for any $t \geq 1$ and $v \geq 1$. It is noted that the confidence parameter $\hat{g}^*$ and the criterion ration $\hat{\gamma}^*$ can be determined by using a standard search algorithm, where $g_1(\gamma)$ and $g_2(\gamma)$ are calculated for each $\gamma$ by a binary search algorithm, as can be appreciated by those of ordinary skill within the art.

The first stage 202 of FIG. 3 that has been described simply takes $n_0$ samples from each candidate configuration, and does not make any decisions as to whether a given candidate configuration is better than the standard configuration. However, $n_0$ samples may suffice to determine that a candidate configuration is better than the standard configuration, so that the method 200 can terminate within the first stage 202, such that the second stage 204 is skipped. Even if no better candidate configurations are found, it may be able to be determined that some candidate configurations are worse than the standard configuration. By screening these worse candidate configurations from consideration within the second stage 204, the number of samples $N_i$'s can be reduced.

Two alternative embodiments for the first stage 202 of the method 200 of FIG. 2 are now described, either of which can be used in lieu of the first stage 202 of the embodiment of FIG. 3. The first embodiment is described in relation to FIG. 5, and is referred to as a first stage selection (FSS) approach. The second embodiment is described in relation to FIG. 6, and is referred to as a screening to the best (STB) approach. Both FSS and STB may select a better candidate configuration or the standard configuration by just taking $n_0$ samples from each configuration. When FSS or STB selects a configuration, the selected configuration is correct with high probability. However, FSS or STB may not select any configuration. In this case, these approaches provided a subset of candidates, $S \subseteq C$, that should be considered in the second stage 204 of FIG. 4, instead of all the candidates C.

The properties of FSS and STB are summarized as follows. $\pi$ is the configuration selected by FSS or STB, and $S \subset C$ is the set of candidates provided by FSS or STB when no configuration is selected. $\pi = \emptyset$ denotes that no configuration has been selected. Then, $$Pr(\pi \in \{\pi_0, \emptyset\} | \mu_0 \geq \mu_b) \geq 1 - \alpha_1 \tag{17}$$

$$Pr((\pi = \emptyset \text{ and } \exists \pi_i \in S \text{ such that } \mu_i \geq \mu_0 + \delta) \text{ or } \pi \in B | \mu_b \geq \mu_0 + \delta) \geq 1 - \alpha_1 \tag{18}$$

$$Pr(\pi \in B \cup \{\pi_0, \emptyset\} | \mu_0 + \delta > \mu_b > \mu_0) \geq 1 - \alpha_1 \tag{19}$$

where $B \equiv \{\pi_i \in C | \mu_i > \mu_0\}$ is the set of better candidate configurations.

It is noted that when a configuration is selected ($\pi \neq \emptyset$), the selection is correct with probability $\geq 1-\alpha_1$, for a given $\alpha_1$. When no solution is selected ($\pi = \emptyset$), S contains the necessary candidate configurations so that the second stage 204 can select a correct solution from $S \cup \{\pi_0\}$ with high probability. Specifically, whenever there are significantly better candidate configurations in C (i.e., $\exists \pi_i \in C$ such that $\mu_i \geq \mu_0 + \delta$), there is at least one significantly better candidate configuration in S. Note that when there is no significantly better candidate, $\pi_0$ is a correct selection, and S does not have to contain any particular candidate configuration.

When FSS or STB is used as the first stage 202 within the method 200, FSS or STB is run with error probability $\alpha_1 < \alpha$, where $\alpha$ is the overall error probability. If no solution is selected within this first stage 202, then the second stage 204 is run where the error probability is $\alpha_2 = \alpha - \alpha_1$ and the set of candidate configurations is S. Note that if the method 200 is correct at stage i with probability $\geq 1-\alpha_i$ for $i=1, 2$, then the method 200 is correct overall with probability $\geq 1-(\alpha_1+\alpha_2)$, since $Pr(E_1 \cap E_2) \geq 1-(Pr(\overline{E}_1)+Pr(\overline{E}_2))$, where $E_i$ is the event that the method 200 is correct at stage i for i=1, 2. Note that $E_1$ and $E_2$ can have arbitrary correlation.

Figure 5:
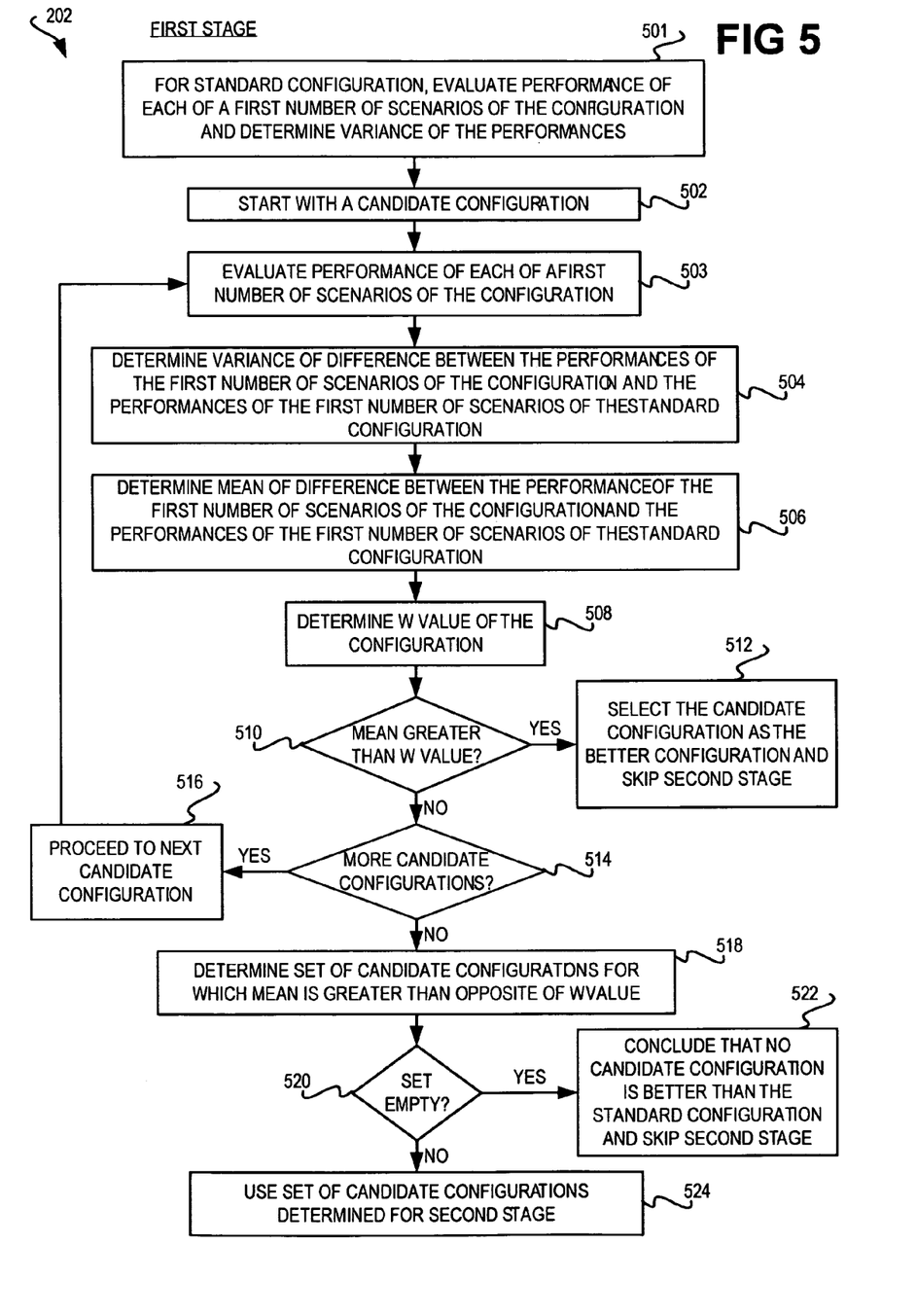
FIG. 5 is a flowchart of a method of the first stage of the method of FIG. 2 in detail, according to another embodiment of the invention.

FIG. 5 shows an FSS approach to the first stage 202, according to an embodiment of the invention. The motivation of the FSS approach in FIG. 5 is to compare the sample mean of each candidate configuration to that of the standard configuration after $n_0$ samples have been taken. If the difference between the sample means are large relative to the sample variance of the difference, it can be determined that the candidate configuration is better or worse than the standard configuration. If the difference is small, then FSS cannot determine whether the candidate configuration is better or worse, and the candidate configuration is placed into S.

First, for the standard configuration, the performance of each of a first number of scenarios of the configuration is determined, and the variance of the performances is determined (501). Part 501 may be considered as the performance of parts 302 and 304 of the method 300 in relation to the standard configuration only. Thus, $n_0$ samples are taken from the standard configuration $\pi_0$.

The candidate configurations are then evaluated in any order of C, such that the evaluation starts with a given candidate configuration (502). However, as has been described, it is better to first sample from candidate configurations that are more likely to be better than the standard configuration. Thus, if there is prior information as to which candidate configurations are more likely to be better, C should be reordered. The performance of each candidate configuration of a first number of scenarios is evaluated (503). That is, $n_0$ samples are taken from a candidate configurations $\pi_i$. In part 502, part 304 of the method 300 may also be performed in relation to the candidate configuration in question. Thus, the variance of the performances of the first number of scenarios of the candidate configuration may further be determined, just in case the second stage 204 is to be performed.

The variance of the difference between the performances of the first number of scenarios of the candidate configuration and the performances of the first number of scenarios of the standard configuration is determined (504). Likewise, the mean of the difference between the performance of the first number of scenarios of the candidate configuration and the performances of the first number of scenarios of the standard configuration is determined (506). That is, the sample mean, $\overline{X_{i0}}$, and the sample variance, $S_{i0}^2$, of the difference between a sample from $\pi_i$ and a sample from $\pi_0$ are determined, via $$\overline{X_{ij}} = \frac{1}{n_0} \sum_{\ell=0}^{n_0} (X_{i,\ell} - X_{j,\ell}) \tag{20}$$

$$S_{ij}^2 = \frac{1}{n_0-1} \sum_{\ell=1}^{n_0} ((X_{i,\ell} - X_{j,\ell}) - \overline{X_{ij}})^2, \tag{21}$$

where $j = 0$.

The first stage 202 of FIG. 5 then determines what is referred to as a W value of the candidate configuration, which is defined as $$W_{i0} \equiv h \sqrt{\frac{S_{i0}^2}{n_0}}.$$

The W value is used as a criterion as to whether $\overline{X_{i0}}$ is large enough to conclude that $\pi_i$, is a better candidate configuration than the standard configuration (510). This criterion is thus specifically $$\overline{X_{i0}} \geq W_{i0} \equiv h\sqrt{\frac{S_{i0}}{n_0}}, \tag{22}$$

where h is the smallest h such that $$Pr(T_{n_0-1} \geq h) \leq \frac{\alpha_1}{k},$$

where $T_v$ has the t-distribution with degree of freedom v. The probability that the worse candidate ($\pi_i$ with $\mu_i \leq \mu_0$) satisfies the criterion (22) is the same as Pr $(T_{n_0-1} \geq h)$. Since there are at most k worse candidate configurations, the probability of selecting a worse candidate is bounded by $\alpha_1$. It is noted that the threshold $W_{i0}$ in criterion (22) is unlike the threshold c in criterion (5). The latter is a fixed constant, whereas the former is a function of $S_{i0}^2$.

If the criterion is satisfied in relation to the current candidate configuration under consideration (510), then this candidate configuration is selected as the candidate configuration that is better than the standard configuration for the computerized system and the second stage 204 is skipped (512). That is, the first stage 202 of FIG. 5 is exited, and the second stage 204 is not performed. If the criterion is not satisfied in relation to the current candidate configuration (510), and if there are additional candidate configurations in C that have not yet been considered (514), then the first stage 202 of FIG. 4 proceeds to the next candidate configuration (516), and repeats at part 503.

Ultimately, where no better candidate configuration is founded via the criterion (510), and there are no additional candidate configurations to consider (516), then the first stage 202 of FIG. 5 determines the set of candidate configurations for which the mean is greater than the opposite of the W value (518). That is, FSS determines the set of candidates, S, having a sample mean that is not too small, such that these candidates may be better than the standard configuration, via $$S=\{\pi_i \in C | \overline{X_{i0}} > -W_{i0}\}.$$

The candidates that are not in S are determined to be worse than the standard configuration.

If the set S is empty (520), then it is determined that the standard configuration is better than all the candidate configurations, and the second stage 204 is skipped (522). That is, the second stage 204 is not performed, since there is no candidate configuration that may be better than the standard configuration, such that $\pi=\pi_0$. If the set S is not empty (520), however, then this set S is used as the candidate configurations for the second stage 204 (524). That is, the second stage 204 is performed not in relation to all the candidate configurations in C, but rather only those candidate configurations in $S \subseteq C$, such that the candidate configurations that are known to be worse than the standard configuration are not considered.

Figure 6:
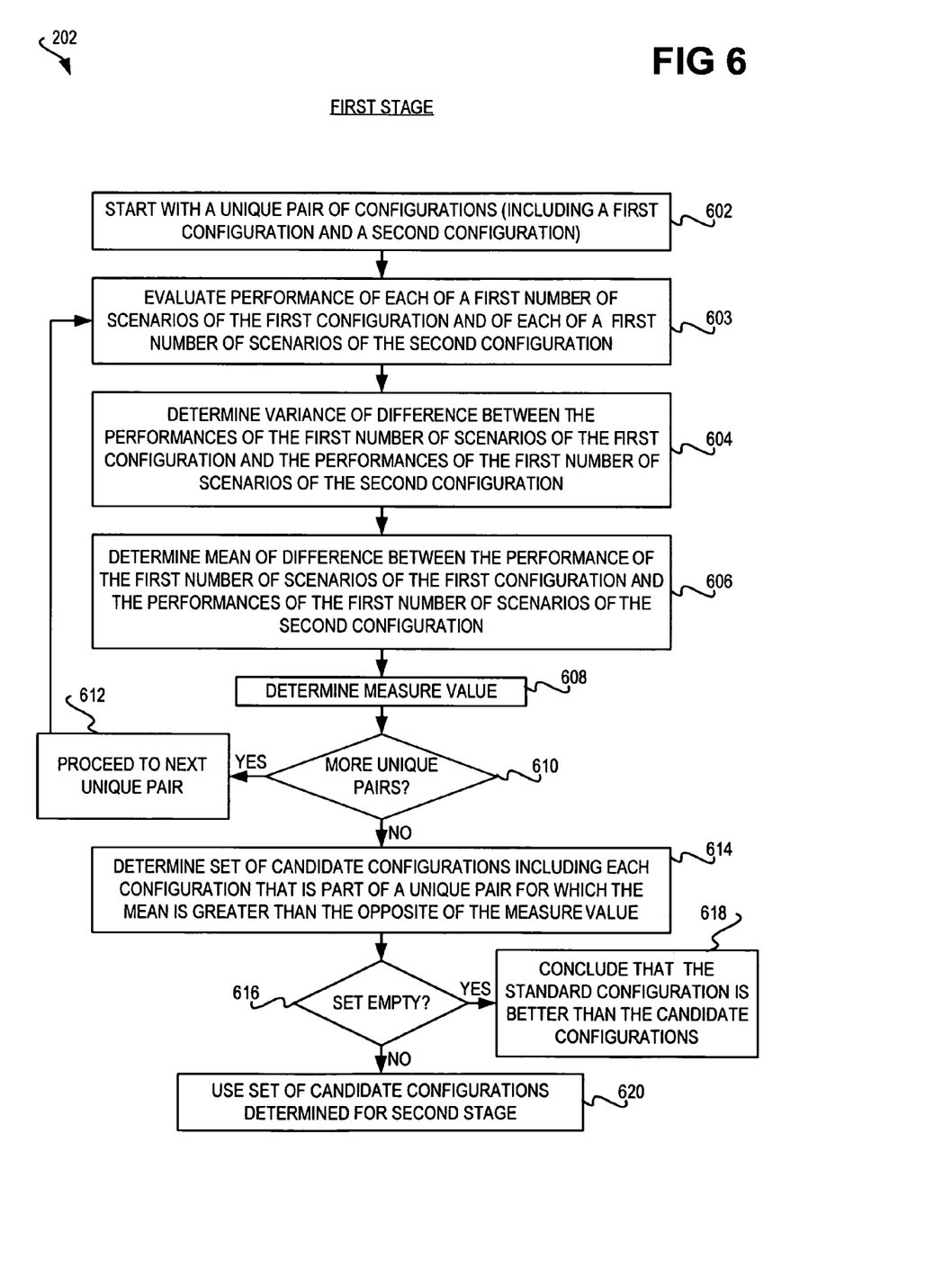
FIG. 6 is a flowchart of a method of the first stage of the method of FIG. 2 in detail, according to still another embodiment of the invention.

FIG. 6 shows an STB approach to the first stage 202, according to an embodiment of the invention. The motivation of the STB approach in FIG. 6 is that a configuration candidate may be screen from subsequent consideration in the second stage 204, even if its sample mean is not much smaller than that of the standard configuration, if the sample mean is much smaller than that of another candidate configuration. When there are better candidate configurations than the standard configuration, S does not have to contain all the candidate configurations that may be better than the standard configuration. Rather, it suffices that S contains only the best candidate configuration. STB finds a set of candidate configurations, S, that may be the best among all the candidate configurations, C. If S is empty, STB selects the standard configuration.

First, the following is performed for each unique pair of configurations, where the configurations from which the unique pair is selected includes the standard configuration and the candidate configurations. A unique pair of configurations includes a first configuration of the pair and a second configuration of the pair is thus selected (602). For example, if the standard configuration and the candidate configurations include $C_1$, $C_2$, and $C_3$, there are three different unique pairs: $(C_1,C_2)$, $(C_1,C_3)$, and $(C_2,C_3)$. The performance of each of a first number of scenarios $n_0$ of the first configuration and the performance of each of a first number of scenarios $n_0$ of the second configuration are evaluated (603). It is noted, however, if the unique pair being evaluated includes a configuration that was part of another unique pair previously evaluated, then the performance of such a configuration does not have to be re-evaluated. Part 603 can also be considered as taking $n_0$ samples from each of the first configuration and the second configuration of the unique pair in question.

Thereafter, the variance of the difference between the performances of the first number of scenarios of the first configuration and the performances of the first number of scenarios of the second configuration is determined (604). Likewise, the mean of the difference between the performance of the first number of scenarios of the first configuration and the performance of the first number of scenarios of the second configuration is determined (606). That is, the sample mean, $\overline{X_{ij}}$, and the sample variance, $S_{ij}^2$, of the difference between a sample from $\pi_i$ and a sample from $\pi_j$ are determined, via (20) and (21).

Next, a measure value, similar to the W value noted above, is determined for the pair of configurations (608), as $$W_{ij} \equiv h\sqrt{\frac{S_{i0}^2}{n_0}}.$$

If there are additional unique pairs of configurations (610), then the first stage 202 proceeds to the next unique pair (612), and the first stage 202 is repeated at part 603 in relation to this new unique pair. Ultimately, there are no further unique pairs of configurations (610), in which case the first stage 202 proceeds to part 614.

A set of candidate configuration is therefore determined as including each candidate configuration that is part of a unique pair for which the mean is greater than the opposite of the measure value (614). This particularly means for the purposes herein that what is determined is whether $\overline{X_{ij}}$ is large enough to conclude that $\pi_j$ is not the best configuration for the computerized system. The criterion is particularly $$\overline{X_{ij}} > -W_{ij} \equiv -h\sqrt{\frac{S_{ij}^2}{n_0}}, \quad (23)$$

where h is the smallest h such that $$Pr(T_{n_0-1} \geq h) \leq \frac{\alpha_1}{k},$$

as noted above. If criterion (23) holds for at least one $\pi_i \in A$, then $\pi_j$ is not included in S. This is what is particularly meant herein by the set of candidate configurations S including each configuration that is part of a unique pair for which the mean is greater than the opposite of the measure value, and this phrase is shorthand for this mathematical criterion for building the set S.

If the set S is empty (616), then it is determined that the standard configuration is better than all the candidate configurations for the computerized system (618), and the second stage 204 is not performed (i.e., it is skipped), since there is no candidate configuration better than the standard configuration. However, if the S is not empty (616), then this set S is used within the second stage 204 (620), because there is a chance that one of the candidate configurations of this set is better than the standard configuration. That is, the second stage 204 is performed not in relation to all the candidate configurations in C, but rather only those candidate configurations in $S \subseteq C$, such that the candidate configurations that are known to be worse than the standard configuration are not considered.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method for determining a better configuration for a computerized system, comprising:

in a first stage,
for each given configuration of a plurality of configurations, including a standard configuration and a plurality of candidate configurations, for the computerized system,
evaluating performance of each of a first number of scenarios in which the given configuration is able to be simulated;
determining a variance of the performances of the first number of scenarios of the given configuration; and,
in a second stage,
for each given configuration of the plurality of configurations for the computerized system,
determining a second number of scenarios in which the given configuration is able to be simulated and for which performance of the given configuration is able to be evaluated, based on the variance of the performances of the first number of scenarios of the given configuration;

evaluating performance of each of a third number of scenarios in which the standard configuration is able to be simulated, the third number of scenarios based on the second number of scenarios and the first number of scenarios;

determining a mean of the performances of the second number of scenarios of the standard configuration;

for each candidate configuration of the plurality of candidate configurations for the computerized system, in an order of the candidate configurations, evaluating performance of each of a third number of scenarios in which the candidate configuration is able to be simulated, the third number of scenarios based on the second number of scenarios and the first number of scenarios;

determining a mean of the performances of the second number of scenarios of the candidate configuration;

where the mean of the performances of the second number of scenarios of the candidate configuration is greater than the mean of the performances of the second number of scenarios of the standard configuration by more than a threshold, selecting the candidate configuration as the better configuration for the computerized system and exiting the second stage;

otherwise, selecting the standard configuration for the computerized system as the better configuration for the computerized system, wherein the method further comprises, in the first stage, for each candidate configuration of the plurality of candidate configurations for the computerized system, in the order of the candidate configurations, determining a mean of the differences in the performances of the first number of scenarios of the candidate configuration and the performances of the first number of scenarios of the standard configuration;

determining a variance of the differences in the performances of the first number of scenarios of the candidate configuration and the performances of the first number of scenarios of the standard configuration;

where the mean is greater than or equal to a value times the square root of the variance divided by the first number of scenarios, selecting the candidate configuration as the better configuration for the computerized system, exiting the first stage, and skipping the second stage;

determining a sub-plurality of the candidate configurations as including each candidate configuration for which the mean is greater than the opposite of the value times the square root of the variance divided by the first number of scenarios;

where the sub-plurality of the candidate configurations is empty, selecting the standard configuration as the better configuration for the computerized system, exiting the first stage, and skipping the second stage; and, otherwise, setting the plurality of candidate configurations to be evaluated in the second stage equal to the sub-plurality of candidate configurations.

2. The method of claim 1, wherein, for each given configuration of the plurality of configurations, determining the second number of scenarios in which the given configuration is able to be simulated and for which performance of the given configuration is able to be evaluated comprises determining the second number of scenarios as the larger of the first number of scenarios and the square of a confidence parameter value times the variance of the performance of the first number of scenarios of the given configuration divided by the square of an indifference zone value.

3. The method of claim 1, wherein the third number of scenarios in which the standard configuration is able to be simulated is equal to the second number of scenarios in which the standard configuration is able to be simulated minus the first number of scenarios in which the standard configuration is able to be simulated, and wherein, for each candidate configuration, the third number of scenarios in which the candidate configuration is able to be simulated is equal to the second number of scenarios in which the candidate configuration is able to be simulated minus the first number of scenarios in which the candidate configuration is able to be simulated.

4. The method of claim 1, wherein the threshold is equal to a criterion ratio value times an indifference zone value.

5. The method of claim 4, wherein the criterion ratio is related to a confidence parameter value.

6. The method of claim 1, wherein the order of the candidate configurations is an arbitrary order of the candidate configurations.

7. The method of claim 1, wherein the order of the candidate configurations is a random order of the candidate configurations.

8. The method of claim 1, wherein the order of the candidate configurations is an optimal order of the candidate configurations.

9. The method of claim 1, wherein only necessary, and not all, of the candidate configurations are evaluated to determine whether any candidate configuration is the better configuration for the computerized system.

10. The method of claim 9, wherein the necessary candidate configurations are evaluated only with necessary accuracy to determine whether any candidate configuration is the better configuration for the computerized system.

11. A computerized system comprising:
hardware;
a simulation component to test a target system; and,
a selection component,
wherein one or more of the simulation component and the selection component are implemented at least via the hardware, and
wherein the selection component is to direct the simulation component to test the target system, and to select a substantially optimal configuration for the target system, the selection component to perform:
a) selecting a standard configuration for the target system;
b) defining a plurality of candidate configurations for the target system as neighboring configurations to the standard configuration;
c) performing a first stage and a second stage to determine whether any candidate configuration is better than the standard configuration;
d) where a candidate configuration is better than the standard configuration, replacing the standard configuration with the candidate configuration and repeating at b); and,
e) where no candidate configuration is better than the standard configuration, selecting the standard configuration as the substantially optimal configuration for the target system, wherein the first stage comprises:
for the standard configuration and each given candidate configuration,
evaluating performance of each of a first number of scenarios in which the given candidate configuration is able to be simulated;
determining a variance of the performances of the first number of scenarios of the given candidate configuration; and,
wherein the second stage comprises:
for the standard configuration and each given candidate configuration,
determining a second number of scenarios in which the given candidate configuration is able to be simulated and for which performance of the given candidate configuration is able to be evaluated, based on the variance of the performances of the first number of scenarios of the given candidate configuration;
evaluating performance of each of a third number of scenarios in which the standard configuration is able to be simulated, the third number of scenarios based on the second number of scenarios and the first number of scenarios;
determining a mean of the performances of the second number of scenarios of the standard configuration;
for each candidate configuration, in an order of the candidate configurations,
evaluating performance of each of a third number of scenarios in which the candidate configuration is able to be simulated, the third number of scenarios based on the second number of scenarios and the first number of scenarios;
determining a mean of the performances of the second number of scenarios of the candidate configuration;
where the mean of the performances of the second number of scenarios of the candidate configuration is greater than the mean of the performances of the second number of scenarios of the standard configuration by more than a threshold, selecting the candidate configuration as a better configuration for the target system and exiting the second stage; and,
otherwise, selecting the standard configuration for the target system as the better configuration for the target system,
wherein the selection component is further to perform, in the first stage, one of a first set of actions and a second set of actions,
wherein the first set of actions comprises:
for each candidate configuration of the plurality of candidate configurations for the target system, in the order of the candidate configurations,
determining a mean of the differences in the performances of the first number of scenarios of the candidate configuration and the performances of the first number of scenarios of the standard configuration;
determining a variance of the differences in the performances of the first number of scenarios of the candidate configuration and the performances of the first number of scenarios of the standard configuration;
where the mean is greater than or equal to a value times the square root of the variance divided by the first number of scenarios, selecting the candidate configuration as a better configuration for the target system, exiting the first stage, and skipping the second stage;
determining a sub-plurality of the candidate configurations as including each candidate configuration for which the mean is greater than the opposite of the value times the square root of the variance divided by the first number of scenarios;
where the sub-plurality of the candidate configurations is empty, selecting the standard configuration as the better configuration for the target system, exiting the first stage, and skipping the second stage; and,
otherwise, setting the plurality of candidate configurations to be evaluated in the second stage equal to the sub-plurality of candidate configurations,
wherein the second set of actions comprises:
for each unique pair of configurations of the plurality of configurations for the target system, the unique pair including a first configuration and a second configuration,
determining a mean of the differences in the performances of the first number of scenarios of the first configuration and the performances of the first number of scenarios of the second configuration;
determining a variance of the differences in the performances of the first number of scenarios of the first configuration and the performances of the first number of scenarios of the second configuration;
determining a measure value for the unique pair of configurations as equal to a value times the square root of the variance of the differences in the performances divided by the first number of scenarios;
determining a sub-plurality of the candidate configurations as including each candidate configuration that is part of a unique pair of configurations for which the mean of the differences in the performances is greater than the opposite of the measure value for the unique pair of configurations;
where the sub-plurality of the candidate configurations is empty, selecting the standard configuration as a better configuration for the target system, exiting the first stage, and skipping the second stage; and,
otherwise, setting the plurality of candidate configurations to be evaluated in the second stage equal to the sub-plurality of candidate configurations.

12. An article of manufacture comprising:
a tangible computer-readable storage medium; and,
means in the medium for:
a) selecting a standard configuration for a computerized system;
b) defining a plurality of candidate configurations for the computerized system as neighboring configurations to the standard configuration;
c) performing a first stage and a second stage to determine whether any candidate configuration is better than the standard configuration;
d) where a candidate configuration is better than the standard configuration, replacing the standard configuration with the candidate configuration and repeating at b); and,
e) where no candidate configuration is better than the standard configuration, selecting the standard configuration as the substantially optimal configuration for the computerized system,
wherein the first stage comprises:
for the standard configuration and each given candidate configuration, evaluating performance of each of a first number of scenarios in which the given candidate configuration is able to be simulated;

determining a variance of the performances of the first number of scenarios of the given candidate configuration; and, wherein the second stage comprises:

for the standard configuration and each given candidate configuration, determining a second number of scenarios in which the given candidate configuration is able to be simulated and for which performance of the given candidate configuration is able to be evaluated, based on the variance of the performances of the first number of scenarios of the given candidate configuration;

evaluating performance of each of a third number of scenarios in which the standard configuration is able to be simulated, the third number of scenarios based on the second number of scenarios and the first number of scenarios;

determining a mean of the performances of the second number of scenarios of the standard configuration;

for each candidate configuration of the plurality of candidate configurations for the computerized system, in an order of the candidate configurations, evaluating performance of each of a third number of scenarios in which the candidate configuration is able to be simulated, the third number of scenarios based on the second number of scenarios and the first number of scenarios;

determining a mean of the performances of the second number of scenarios of the candidate configuration;

where the mean of the performances of the second number of scenarios of the candidate configuration is greater than the mean of the performances of the second number of scenarios of the standard configuration by more than a threshold, selecting the candidate configuration as the better configuration for the computerized system and exiting the second stage; and, otherwise, selecting the standard configuration for the computerized system as the better configuration for the computerized system, wherein the means is farther for, in the first stage, for each unique pair of configurations of the plurality of configurations for the computerized system, the unique pair including a first configuration and a second configuration, determining a mean of the differences in the performances of the first number of scenarios of the first configuration and the performances of the first number of scenarios of the second configuration;

determining a variance of the differences in the performances of the first number of scenarios of the first configuration and the performances of the first number of scenarios of the second configuration;

determining a measure value for the unique pair of configurations as equal to a value times the square root of the variance of the differences in the performances divided by the first number of scenarios;

determining a sub-plurality of the candidate configurations as including each candidate configuration that is part of a unique pair of configurations for which the mean of the differences in the performances is greater than the opposite of the measure value for the unique pair of configurations;

where the sub-plurality of the candidate configurations is empty, selecting the standard configuration as the better configuration for the computerized system, exiting the first stage, and skipping the second stage; and, otherwise, setting the plurality of candidate configurations to be evaluated in the second stage equal to the sub-plurality of candidate configurations.

* * * * *